(12) United States Patent
Hodgson, Jr.

(10) Patent No.: US 6,709,483 B1
(45) Date of Patent: Mar. 23, 2004

(54) REGENERATIVE CARBON DIOXIDE ($CO_2$) REMOVAL SYSTEM

(75) Inventor: Edward W. Hodgson, Jr., Granby, CT (US)

(73) Assignee: Hamilton Sundstrand Corp., Windsor Locks, CT (US)

( * ) Notice: Subject to any disclaimer, the term of this patent is extended or adjusted under 35 U.S.C. 154(b) by 0 days.

(21) Appl. No.: 10/265,495

(22) Filed: Oct. 7, 2002

(51) Int. Cl.[7] .......................... B01D 53/04; B01D 53/22
(52) U.S. Cl. ............................. 95/51; 95/98; 95/101; 95/105; 95/139; 96/4; 96/130; 96/143
(58) Field of Search .................. 95/51, 98, 101–105, 95/139; 96/4, 127–130, 132, 134–136, 142–144

(56) References Cited

U.S. PATENT DOCUMENTS

| | | | | |
|---|---|---|---|---|
| 3,242,651 A | * | 3/1966 | Arnoldi | 96/127 |
| 3,355,860 A | * | 12/1967 | Arnoldi | 95/102 |
| 3,659,400 A | * | 5/1972 | Kester | 95/9 |
| 4,386,944 A | * | 6/1983 | Kimura | 95/51 |
| 4,407,134 A | * | 10/1983 | Snaper | 62/5 |
| 4,769,051 A | * | 9/1988 | Defrancesco | 96/128 |
| 5,005,787 A | * | 4/1991 | Cullingford | 244/163 |
| 5,061,455 A | * | 10/1991 | Brose et al. | 96/122 |
| 5,082,471 A | * | 1/1992 | Athayde et al. | 95/51 |
| 5,120,329 A | * | 6/1992 | Sauer et al. | 95/8 |
| 5,281,254 A | * | 1/1994 | Birbara et al. | 95/44 |
| 5,385,603 A | * | 1/1995 | Sienack | 96/125 |
| 5,429,663 A | * | 7/1995 | Cassidy et al. | 95/21 |
| 5,876,486 A | * | 3/1999 | Steinwandel et al. | 95/44 |
| 5,876,488 A | * | 3/1999 | Birbara et al. | 96/111 |
| 6,156,096 A | * | 12/2000 | Sirkar | 95/44 |
| 6,322,612 B1 | * | 11/2001 | Sircar et al. | 95/97 |
| 6,364,938 B1 | * | 4/2002 | Birbara et al. | 95/139 |
| 6,402,812 B1 | * | 6/2002 | Perrotta et al. | 95/95 |

FOREIGN PATENT DOCUMENTS

WO    WO94/01203 A1  *  1/1994

* cited by examiner

Primary Examiner—Robert H. Spitzer
(74) Attorney, Agent, or Firm—William W. Jones

(57) ABSTRACT

A carbon dioxide ($CO_2$) adsorption membrane or bed is operative to separate metabolic $CO_2$ from an exhaust stream from a breathable atmosphere which is discharged from a closed habitable environment. The habitable environment is in a low ambient pressure surrounding. A portion of the scrubbed exhaust gas stream is diverted from the habitable environment and passed through a desorption chamber. The desorption chamber is open to the low ambient pressure surrounding to maintain a pressure which is slightly greater than the pressure in the ambient surrounding so that the desorption chamber gas stream will exit the system into the ambient surroundings. When the diverted exhaust gas enters the low pressure desorption pressure chamber its $CO_2$ partial pressure content is reduced. The reduced $CO_2$ partial pressure content of the gas stream in the desorption chamber enables the desorption chamber gas stream to remove $CO_2$ from the adsorption membrane or bed.

24 Claims, 2 Drawing Sheets

REGENERATIVE CARBON DIOXIDE ($CO_2$) REMOVAL SYSTEM

TECHNICAL FIELD

Figure 1:
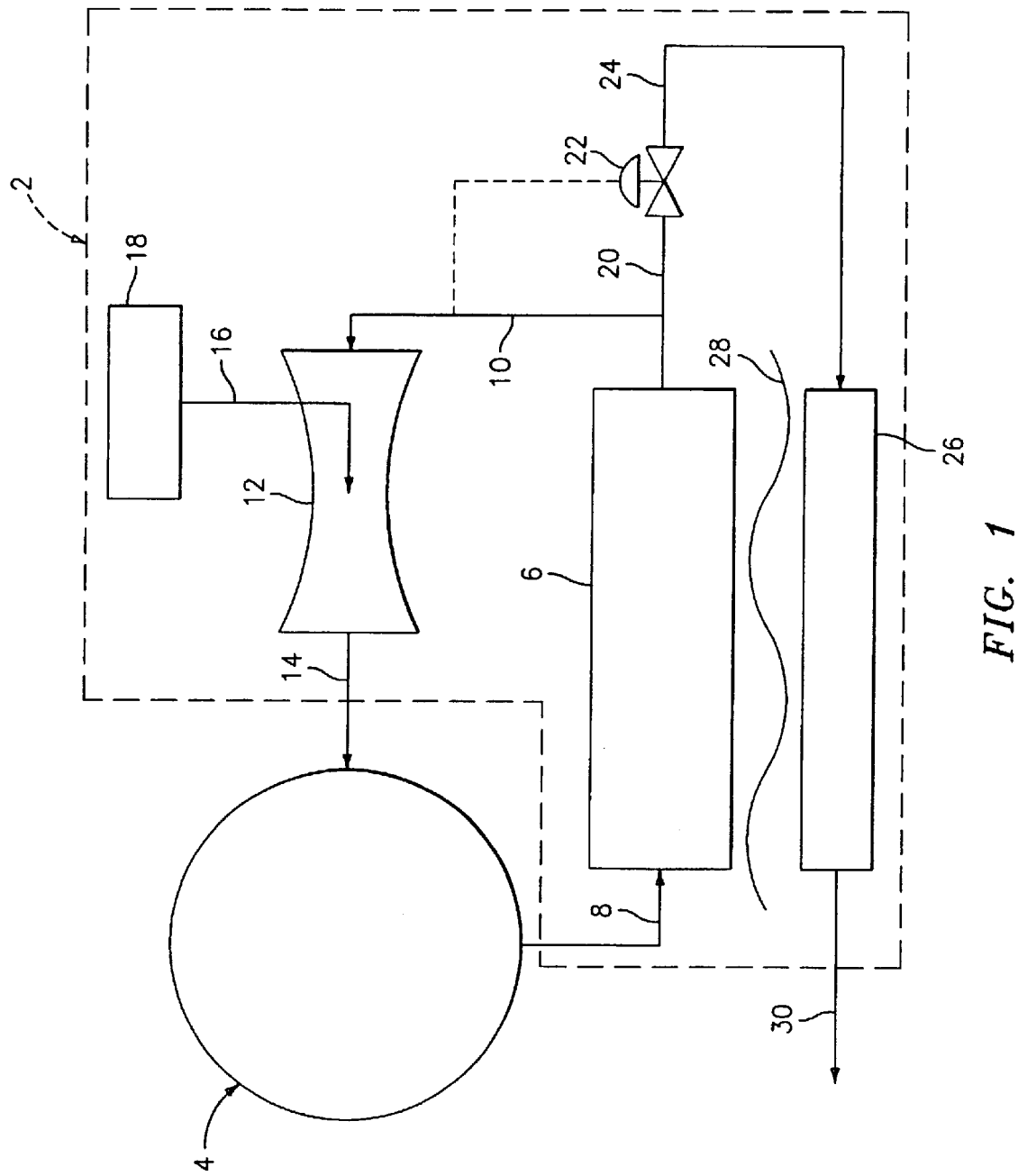

The present invention relates to a method and system for adsorbing carbon dioxide ($CO_2$) from a breathable gas stream which gas stream is derived from a closed habitable environment and which method and system are operative to regenerate an adsorbent on or in which the $CO_2$ is adsorbed. More particularly, the method and system of this invention utilize a sweep gas stream having a low $CO_2$ partial pressure to strip adsorbed $CO_2$ from the adsorbent. The low $CO_2$ partial pressure sweep gas stream is produced by expanding the volume of a portion of the breathable gas stream after the latter has passed through the $CO_2$ adsorption station in the system. The remainder of the $CO_2$ desorbed breathable gas stream is returned to the habitable environment. An expanded portion of the breathing gas could also be used as a desorption sweep gas for the adsorption bed. This option would require a slightly higher volume of the sweep gas flow, but would allow decreasing the size and pressure drop of the $CO_2$ removal system. The choice of the aforesaid options will depend on system level factors which include the gas circulation assembly and the system operating pressure.

BACKGROUND OF THE INVENTION

Carbon dioxide ($CO_2$) removal systems which continuously or cyclically dump the removed $CO_2$ (and possibly water vapor) to an ambient environment have seen substantial development in recent years. They offer significant reductions in the on-back weight of regenerable EVA life support systems and are therefore highly desirable for future systems. One major problem with their use has been the fact that they will not work in environments, for example, like Mars, where the ambient atmosphere contains $CO_2$ at a partial pressure near or above the acceptable values in the space suit breathing atmosphere. Under these conditions, desorption or transport processes which are partial pressure driven are incapable of stripping adsorbed metabolic $CO_2$ from an adsorption station so as to enable the adsorption station to produce a breathable atmosphere.

Solutions to the problem which have been proposed include the addition of thermal energy to allow desorption at higher partial pressures and the use of regenerative combinations of compressors and turbines to achieve a higher gas pressure from which the transport gradient is favorable. Both of these approaches require the addition of appreciable energy during operation and of added equipment to the system. This adds weight and system complexity making the system less desirable for long planetary exploration missions.

It would be desirable to provide a regenerable $CO_2$ adsorption system which is compact, light in weight, and can operate satisfactorily in an ambient atmosphere such as that which exists on the planet Mars.

DISCLOSURE OF THE INVENTION

This invention relates to a method and system of dumping stripped $CO_2$ into an ambient environment which ambient environment having an atmosphere which has a relatively high $CO_2$ partial pressure, such as the atmosphere on the planet Mars. The system and method of this invention are extremely uncomplicated and require minimal energy input.

The system and method of this invention make use of a small divergent flow of a $CO_2$-cleansed air flow stream, which cleansed air flow stream is derived from the space suit or space station ventilation loop downstream of the $CO_2$ adsorption station. In an ejector-driven system of the type described hereinafter, the diverting of a portion of the $CO_2$-cleansed air stream from the ventilation loop will create no significant operational or design problems. A bleed valve is all that is necessary in the ventilation loop to divert the portion of the $CO_2$-cleansed air stream to the $CO_2$ desorption station of the system. The bleed valve can be periodically opened by a habitat controller, such as a microprocessor computer, or the like, if so desired.

The system and method of this invention make use of an ambient atmosphere pressure that is well below the pressure which is maintained in the habitable environment The system and method of this invention utilize a small diverted fraction of the recirculating habitat ventilation flow stream which diverted fraction is expanded in a $CO_2$ desorption station, the latter of which is maintained at a pressure which is near ambient pressure so as to allow gas flow through the $CO_2$ desorption station and thence to the ambient environment This pressure drop produces a proportionally reduced partial pressure of $CO_2$ in the sweep gas stream flowing through the $CO_2$ desorption station. When the volumetrically expanded sweep gas stream flows past a membrane exposed to the $CO_2$-laden vent gas in the space suit, or through a loaded sorbent bed, the favorable $CO_2$ partial pressure gradient which is created will result in the removal of $CO_2$ through the membrane, or from the sorbent bed, to the expanded sweep gas stream. Afterwards, the $CO_2$ laden sweep gas stream is discharged into the surrounding ambient environment The amount of $CO_2$ which can be effectively removed is dependent on the volumetric flow of the sweep gas steam and it can be adjusted to equal the amount of $CO_2$ which is adsorbed from the habitat vent gas stream. The system is self balancing over a broad range of operating conditions since the sorbent or membrane will allow the $CO_2$ partial pressure to rise or fall until the amount of $CO_2$ removed in desorption is equal to the amount of $CO_2$ adsorbed at any given flow rate. A varying partial pressure in the vent loop which exists over a moderate range is typically acceptable, unless the partial pressure value exceeds upper limits for a breathable atmosphere. The amount of $CO_2$ which is desorbed from the sorbent can be adjusted to equal the amount of $CO_2$ which is adsorbed from the habitat vent gas stream. Thus the adsorption desorption values can be put into equilibrium with each other.

In a Mars planet space-suit scenario, the pressure inside the space suit is likely to be 3.8 psia (approximately 200 mm Hg), and the Martian ambient pressure is in the range of approximately 6 to 8 mm Hg. Expansion of the diverted sweep gas creates a sweep gas pressure which is about 16 mm Hg which will permit a sonic discharge to the ambient atmosphere thus ensuring good isolation, i.e., no back flow, by providing a 12:1 volumetric expansion of the diverted sweep gas stream. Only about 8% of the recirculating gas flow stream would be required to be diverted in order to ensure a satisfactory level of $CO_2$ desorption from the $CO_2$ adsorption station. There is a need to keep the space suit volume and the desorption or membrane diffusion parts of the carbon dioxide removal system at a substantially lower carbon dioxide partial pressure than the surrounding atmosphere into which the system ultimately discharges. Thus back flow and back diffusion must be suppressed. High velocity organized flow through a limited discharge area will accomplish this object It is therefore an object of this invention to provide a method and system for removing $CO_2$ from a recirculating gas stream by means of a $CO_2$ adsorbent station, which gas stream is derived from a breathable atmosphere in a dosed habitable environment such as a space suit or a space station.

It is an additional object of this invention to provide a method and system of the character described wherein the $CO_2$ is stripped from the $CO_2$ adsorbent station by means of a diverted volumetrically expanded fraction of the $CO_2$-cleansed recirculating gas stream.

It is a further object of this invention to provide a method and system of the character described wherein the partial pressure of $CO_2$ in the volumetrically expanded fraction of the recirculating gas stream is lower than the partial pressure of $CO_2$ in the surrounding ambient

DETAILED DESCRIPTION OF THE DRAWINGS

Figure 2:
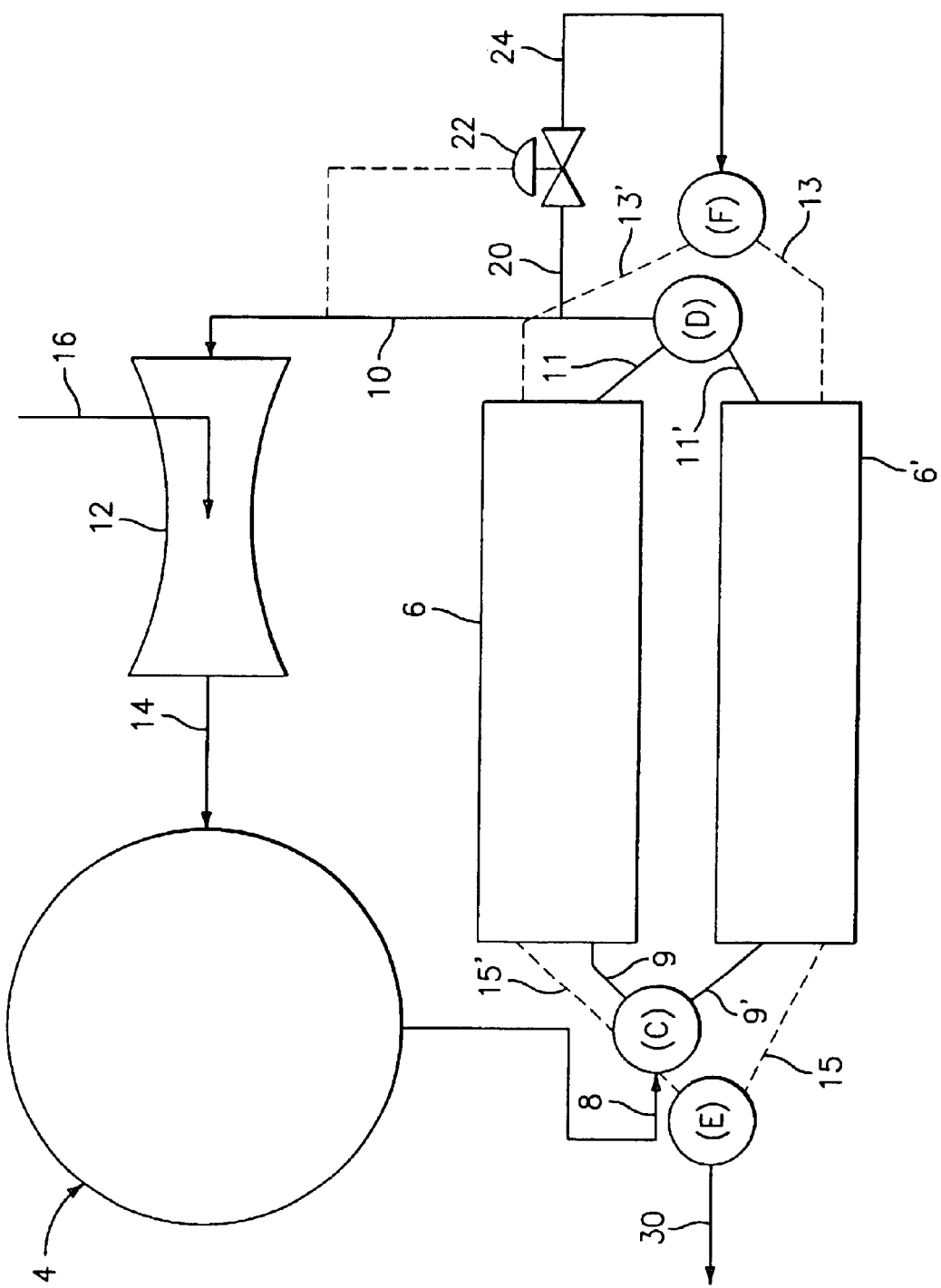

These and other objects of the invention will become more readily apparent from the following detailed description thereof when taken in conjunction with the accompanying drawings, in which:

FIG. 1 is a schematic view of a first embodiment of a regenerative $CO_2$ removal system formed in accordance with this invention; and FIG. 2 is a schematic view of a second embodiment of a $CO_2$ removal system formed in accordance with this invention which utilizes a pair of adsorbtion-desorption beds which are operated in alternative fashion.

SPECIFIC MODE FOR CARRYING OUT THE INVENTION

Referring now to the drawings, there is shown in FIG. 1, a schematic view of a $CO_2$ adsorption and desorption system that is formed in accordance with this invention, which system is designated generally by the numeral 2 and is a component of a dosed habitat 4 such as a space suit, a space station, or the like. The system 2 includes a $CO_2$ adsorption station 6. A first line 8 connects the habitat 4 with one side of the adsorption station 6. A second line 10 connects the $CO_2$ adsorption station 6 with an ejector station 12 which reconnects with the habitat 4 by means of a third line 14. A fourth line 16 provides a pressurized stream of oxygen (from a source 18 thereof) to the ejector station 12 so that the ejector station 12 acts as a Venturi nozzle which serves to provide the driving force to recirculate the $CO_2$-cleansed air in the line 10 back into the habitat 4.

A $CO_2$-cleansed air stream-diverting line 20 is connected to the air stream recirculating line 10. The valve 22 is preferably maintained in a partially opened condition so as to be operative to continuously bleed off a fraction of the air passing through the lines 10 and 20. The line 24 opens into a $CO_2$-scrubbing or desorption station 26 which is maintained at ambient pressure by being vented to the surrounding environment ambient atmosphere through a line 30. A $CO_2$-permeable membrane 28, or other $CO_2$ adsorbent, is interposed between the $CO_2$ adsorption station 6 and the $CO_2$ desorption station 26.

In the case of a Martian atmosphere application, and the space suit system design which is illustrated in FIG. 1, the ratio between the gas pressure at station 6 and station 26 will be approximately 7.5:1 when the station 26 is at the upstream end of the desorption portion of the system, and will be approximately 12:1 when the station 26 is at the downstream end of the desorption portion of the system. The difference in the respective pressure drops is due to the gas flow through the desorption member 28.

Since the full load of desorbed $CO_2$ is not carried by the gas stream until it approaches the downstream exit end of the desorption portion of the system, the exit pressure is important in determining the ability of the system to operate at a given $CO_2$ load (metabolic rate) and discharged gas volume. There is a broad range of pressure ratios at which operation of the system is possible since the operational determining factor is simply that the discharged gas exit the desorbing region with a $CO_2$ partial pressure that is below the acceptable $CO_2$ partial pressure value of the habitat.

The governing factor is that the gas discharge volume at the exit must be approximately equal to, and preferably slightly greater than, the volumetric flow of gas from which $CO_2$ is being removed so that the desorbed partial pressure of $CO_2$ is no higher than the inlet $CO_2$ partial pressure of the circulating atmosphere. When using a desorption membrane, the membrane 28 can be prevented from collapsing into the station 26 while providing a significant pressure differential between the stations 6 and 26 either by using a membrane consisting of a multitude of small diameter cylinders which provide an inherent strength to the membrane that will resist collapse. Another way to deal with this problem would be to reinforce the membrane 28 with a porous backing which would allow passage of the $CO_2$ while sufficiently rigidifying the membrane 28. When the diverted gas stream is introduced into the station 26, the gas stream volume expansion produces a decreased $CO_2$ partial pressure in the gas stream in the station 26, which decreased $CO_2$ partial pressure enables the volumetrically expanded gas stream to strip $CO_2$ from the adsorbent in the adsorption station 6 through the membrane 28. The membrane 28 is a $CO_2$ permeable, but not air permeable. Suitable membranes include "NAFION" (trademark of Dupont). Other suitable membranes include those containing interstitial polar liquids which are contained in the membrane pores, and in which liquids $CO_2$ is more soluble than oxygen or nitrogen. Membranes which include the same types of amine sorbent compounds which are included in cyclic $CO_2$ sorbent beds, or which include enzymes as the selective transport medium will also have utility in a system formed in accordance with this invention.

Instead of a membrane $CO_2$ adsorbent, one can utilize a solid $CO_2$ adsorbent bed formed from a porous member that has a $CO_2$ adsorbent material which is coated on the surface of the porous member. The porous member could be a porous open cell foam member or it The following is an example of typical atmospheric pressures in the system and in the ambient surroundings, which in this case will be presumed to be the planet Mars, as well as the $CO_2$ partial pressures in the system, and in the various components of the system, and in the ambient surroundings. The ambient atmospheric pressure in the surrounding Martian environment seasonally ranges from about 6 mm Hg (≈0.12 PSIA) to 9 mm Hg (≈0.17 PSIA). A mean atmospheric pressure for Mars is 8 mm Hg (≈0.15 PSIA). The $CO_2$ partial pressure in the ambient atmosphere in the surrounding Martian environment is in the range of 6 to 8 mm Hg. The amount of metabolic $CO_2$ produced in the habitat 4, when the habitat 4 is a space suit helmet, will be 0.20 Lb/Hr, and the amount of $O_2$ removed from the helmet 4 by breathing will be 0.16 lb/hr. The resulting atmosphere present in the helmet 4 will be recycled from the helmet 4 at a flow rate of 6 cubic feet per minute through the line 8. The $CO_2$ partial pressure in the line 8 will be 4.8 mm Hg, and the atmospheric pressure in the line 8 will be 3.8 PSIA. After the recycled gas stream passes through the adsorbent bed 6, the $CO_2$ partial pressure in the lines 10 and 20 will be 1 mm Hg and the atmospheric pressure will remain at 3.8 PSIA. The gas stream portion which is bled into the line 24 through the valve 22 is expanded in the valve 22 to a pressure which is between the pressure in the vent loop and that in the ambient Martian atmosphere in flowing through the desorbing station 26 and the discharge line 30. This being the case, the volume of the gas stream in the line 24 will expand at a ratio of approximately 12:1 before exiting the desorption chamber 26 and the atmospheric pressure in the gas will drop to 0.5 PSIA in line 24 and to 0.3 PSIA at the entrance to line 30. As a result the $CO_2$ partial pressure of the gas stream in the line 24 will drop to 0.13 mm Hg due to the expansion of the volume of the gas stream. The gas stream then flows into the desorption station 26 wherein it strips $CO_2$ from adsorption station 6 through the membrane 28. After leaving the station 26, the ambient pressure of the gas stream will be 0.3 PSIA, and the $CO_2$ partial pressure of the exiting gas stream is increased to 4 mm Hg. The amount of $O_2$ and $CO_2$ in the gas stream exiling through the line 30 into the Martian atmosphere will be 0.49 Lb/Hr $O_2$, and 0.2 Lb/Hr $CO_2$, respectively. The above conditions will result in a rate of removal of $CO_2$ from the adsorption station 6 which is equal to the rate of $CO_2$ adsorbed from the recycled gas stream in the adsorption station 6. The flow rate of the recycled gas stream in the line 10 is 5.4 cubic feet per minute. The atmospheric pressure of the gas stream in the line 10 will be 3.8 PSIA, and the $CO_2$ partial pressure in the gas stream will be 1 mm Hg. The amount of $O_2$ in the line 16 which is derived from the oxygen source 18 is 0.65 Lb/Hr. Thus the amount of metabolically consumed oxygen is replenished and the amount of $CO_2$ in the air Referring now to FIG. 2, there is shown a second embodiment of a $CO_2$ removal system which operates in accordance with this invention. Components in the second embodiment which are identical to components that are shown in FIG. 1 have been given the same numerals as used in FIG. 1. The difference between the embodiment shown in FIG. 1 and the embodiment shown in FIG. 2 is that the latter embodiment uses two parallel desorption beds, 6 and 6', one of which will be adsorbing $CO_2$ from the air habitat vent gas stream, and the other of which will be undergoing desorption of adsorbed $CO_2$. Valves are selectively actuated to alter the flow path of the habitat vent gas stream. The system operates as follows.

Assume a mode of operation wherein the bed 6 is the adsorption bed, and the bed 6' is being desorbed. In that case, the valve C will be operative to direct the habitat exhaust gas stream from line 8 through line 9 into the adsorption bed 6. The majority of the $CO_2$-free gas stream leaves the bed 6 through line 11 and is transferred to line 10 by valve D. The gas stream in the line 10 is then returned to the habitat 4, as described above in connection with the system shown in FIG. 1. A portion of the $CO_2$ -free gas stream passes through the lines 20 and 24 via valve 22 and into the valve F which diverts that gas stream portion through the line 13 into the desorption bed 6'. The volume of the diverted gas stream is expanded as it enters the bed 6' thereby lowering the $CO_2$ partial pressure in the diverted gas stream. This enables the diverted gas stream to strip $CO_2$ from the bed 6'. The diverted gas stream thus picks up $CO_2$ from the bed 6' and exits the bed 6' through line 15 wherein it is transferred through valve E to the exhaust line 30.

Now, assume a mode of operation wherein the bed 6' is the adsorption bed, and the bed 6 is being desorbed. In that case, the valve C will be operative to direct the habitat exhaust gas stream from line 8 through line 9' into the adsorption bed 6'. The majority of the $CO_2$-free gas stream leaves the bed 6' through line 11' and is transferred to line 10 by valve D. The gas stream in the line 10 is then returned to the habitat 4, as described above in connection with the system shown in FIG. 1. A portion of the $CO_2$-free gas stream passes through the lines 20 and 24 via valve 22 and into the valve F which diverts that gas stream portion through the line 13' into the desorption bed 6. The volume of the diverted gas stream is expanded as it enters the bed 6 thereby lowering the $CO_2$ partial pressure in the diverted gas stream. This enables the diverted gas stream to strip $CO_2$ from the bed 6. The diverted gas stream thus picks up $CO_2$ from the bed 6 and exits the bed 6 through line 15' wherein it is transferred through valve E to the exhaust line 30.

The system of this invention is suitable for use on the planet Mars, however, it can also be used in other environments where the ambient pressure is appreciably lower than the pressure inside of the habitable environment, be it a space suit, a space craft, a high pressure under water habitat, or the like. The amount of gas consumed in desorbing the adsorption bed will increase with increased ambient pressure, i.e., with a decreased $\Delta P$ between the habitable environment and the surrounding ambient environment This system of this invention may be used in any ambient atmosphere where there is a measurable ambient pressure whereby it is not practical to desorbed the adsorption bed or membrane simply by exposing the bed or membrane to space vacuum. The system of this invention may also be used in an ambient atmosphere which contains toxic components that dictate against desorption of the bed or membrane simply by blowing the ambient atmosphere over the desorption bed or membrane. The system of this invention can, for example, be used in high altitude environs in the Earth's atmosphere.

It will be readily appreciated that this invention can provide adequate $CO_2$ removal from the breathable atmosphere in a closed habitable environment without incurring a significant increase in the system weight of components needed to operate the system. The system and method of this invention are relatively passive in that they do not require significant power input to function. The system and method of this invention are able to function adequately in an ambient atmosphere which has a relatively high $CO_2$ partial pressure.

Since many changes and variations of the disclosed embodiment of the invention may be made without departing from the inventive concept, it is not intended to limit the invention otherwise than as required by the appended claims.

What is claimed is:

1. A method for stripping metabolic carbon dioxide ($CO_2$) from a $CO_2$ sorbent material, said method comprising;
   a) the step of providing a gas stream which contains metabolic $CO_2$;
   b) the step of volumetrically expanding a portion of said gas stream so as to reduce $CO_2$ partial pressure in the portion of said gas stream to a $CO_2$ partial pressure which is operative to strip $CO_2$ from said sorbent material; and
   c) the step of passing said portion of said gas stream past said $CO_2$ sorbent material so as to strip $CO_2$ from said $CO_2$ sorbent material.

2. The method of claim 1 further comprising the step of providing a vent for discharging $CO_2$-containing gas to a low pressure ambient environment.

3. The method of claim 1 wherein said portion of the gas stream is operative to remove $CO_2$ from said sorbent at the same rate that the sorbent removes metabolic $CO_2$ from the gas stream.

4. The method of claim 1 wherein the $CO_2$-containing gas stream is derived from a habitable environment which is pressurized to a pressure of approximately 200 mm Hg and the ambient environment has an ambient pressure in the range of about 6 to about 9 mm Hg.

5. The method of claim 1 wherein said sorbent material is a $CO_2$-permeable membrane.

6. The method of claim 1 wherein said sorbent material is a porous material which is coated with a $CO_2$ adsorbent material.

7. A method for removing metabolic carbon dioxide ($CO_2$) from a breathable atmosphere which is contained in a closed habitable environment, said method comprising:
   a) the step of removing a portion of the atmosphere from said habitable environment to form a gas stream;
   b) the step of passing the gas stream through a $CO_2$ adsorbant station so as to remove $CO_2$ from the gas stream to form an essentially $CO_2$-free gas stream;
   c) the step of returning a first portion of the essentially $CO_2$-free gas stream to the habitable environment; and
   d) the step of passing a second volumetrically expanded portion of the essentially $CO_2$-free gas stream through a $CO_2$ desorption station so as to lower $CO_2$ partial pressure in said volumetrically expanded portion of said essentially $CO_2$-free gas stream to a level that will result in desorption of $CO_2$ from said adsorbant station.

8. The method of claim 7 wherein said adsorption station and said desorption station are disposed on opposite sides of a common $CO_2$ sorbent material.

9. The method of claim 8 wherein said sorbent material is a $CO_2$-permeable membrane.

10. The method of claim 8 wherein said sorbent material is a porous material which is coated with a $CO_2$ adsorbent material.

11. The method of claim 7 further comprising a vent for discharging gas from said desoyption station to the low pressure ambient environment.

12. The method of claim 7 wherein the desorption station is operative to remove $CO_2$ from a sorbent at the same rate that the sorbent removes metabolic $CO_2$ from the gas stream.

13. The method of claim 7 wherein the habitable environment is pressurized to a pressure of approximately 200 mm Hg and the ambient environment has an ambient pressure in the range of about 6 to about 9 mm Hg.

14. The method of claim 7 wherein the ratio between the gas pressure at the adsorption station and the desorption station is about 7.5:1.

15. The method of claim 7 wherein the ratio between the gas pressure at the adsorption station and the desorption station is about 12:1.

16. An assembly for removing metabolic carbon dioxide ($CO_2$) from a breathable gas stream, which stream is derived from a closed habitable environment which habitable environment is located in an ambient environment that has an ambient pressure that is lower than the pressure in said habitable environment, said assembly comprising:
   a) a $CO_2$ adsorption station for removing $CO_2$ from said breathable gas stream thereby creating a low $CO_2$ partial pressure gas stream;
   b) a $CO_2$ desorption station for removing $CO_2$ from said adsorption station, said desorption station having a pressure which is between the pressure in said habitable environment and the pressure in said ambient environment;
   c) a first line which is operative to transfer said breathable gas stream from said habitable environment to said adsorption station;
   d) a second line which is operative to transfer a portion of said low $CO_2$ partial pressure gas stream from said adsorption station to habitable environment; and
   e) a third line which is operative to transfer a remaining portion of said low $CO_2$ partial pressure gas stream from said adsorption station to said desorption station wherein the volume of said low $CO_2$ partial pressure gas stream is expanded so as to further lower the partial pressure of $CO_2$ in said remaining portion of said gas stream.

17. The assembly of claim 16 wherein said adsorption station and said desorption station are disposed on opposite sides of a common $CO_2$ sorbent material.

18. The assembly of claim 17 wherein said sorbent material is a $CO_2$-permeable membrane.

19. The assembly of claim 17 wherein said sorbent material is a porous material which is coated with a $CO_2$ adsorbent material.

20. The assembly of claim 16 further comprising a vent for discharging gas from said desorption station to the low pressure ambient environment.

21. The assembly of claim 16 wherein the desorption station is operative to remove $CO_2$ from a sorbent at the same rate that the sorbent removes metabolic $CO_2$ from the gas stream.

22. The assembly of claim 16 wherein the habitable environment is pressurized to a pressure of approximately 200 mm Hg and the ambient environment has an ambient pressure in the range of about 6 to about 9 mm Hg.

23. The assembly of claim 16 wherein the ratio between the gas pressure at the adsorption station and the desorption station is about 7.5:1.

24. The assembly of claim 16 wherein the ratio between the gas pressure at the adsorption station and the desorption station is about 12:1.

* * * * *